United States Patent
Nagasaka

(10) Patent No.: US 6,707,379 B2
(45) Date of Patent: Mar. 16, 2004

(54) SHIFT DEVICE

(75) Inventor: Chikao Nagasaka, Aichi (JP)

(73) Assignee: Kabushiki Kaisha Tokai Riki Denki Seisakusho, Aichi (JP)

(*) Notice: Subject to any disclaimer, the term of this patent is extended or adjusted under 35 U.S.C. 154(b) by 0 days.

(21) Appl. No.: 10/090,452

(22) Filed: Mar. 4, 2002

(65) Prior Publication Data

US 2002/0196139 A1 Dec. 26, 2002

(30) Foreign Application Priority Data

Mar. 2, 2001 (JP) ........................................ 2001-058569

(51) Int. Cl.[7] ................................................ B60G 1/00
(52) U.S. Cl. ........................ 340/456; 340/438; 340/441
(58) Field of Search ............................... 340/438, 439, 340/441, 456, 459, 461; 701/51, 55, 56, 123; 324/160, 161; 74/335, 336 R

(56) References Cited

U.S. PATENT DOCUMENTS

| | | | |
|---|---|---|---|
| 4,631,515 A | * 12/1986 | Blee et al. | ................... 340/441 |
| 5,017,916 A | * 5/1991 | Londt et al. | ................. 340/439 |
| 5,941,922 A | * 8/1999 | Price et al. | .................. 340/439 |
| 6,137,399 A | * 10/2000 | Westberg et al. | ........... 340/441 |
| 6,356,831 B1 | * 3/2002 | Michelini et al. | ............ 340/438 |

* cited by examiner

*Primary Examiner*—Van Trieu
(74) *Attorney, Agent, or Firm*—Patterson, Thuente, Skaar & Christensen, P.A.

(57) ABSTRACT

A shift device that enables optimally operation. The shift device is provided in a vehicle including a transmission and shifts a shift range of the transmission. The shift device includes a shift operation unit, a controller, and a light emitting device. The shift operation unit is connected to the transmission of the vehicle and shifts the shift range of the transmission. The controller determines whether the shift range of the transmission should be shifted in accordance with a driving environment and generates a shift instruction signal when determining that the shift range of the transmission should be shifted. The light emitting device gives a notification for operation of the shift operation unit in accordance with the shift instruction signal.

12 Claims, 7 Drawing Sheets

Fig. 7
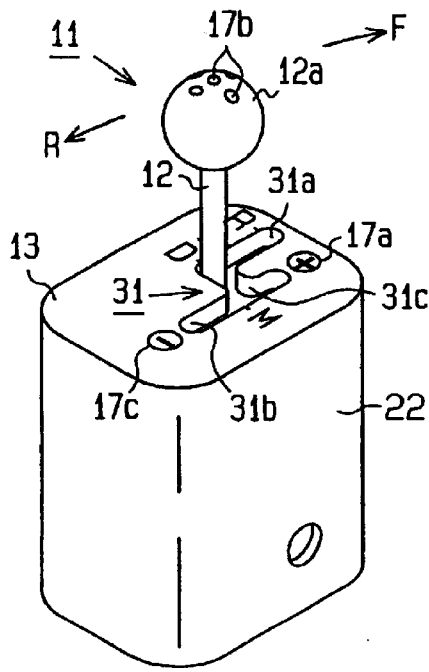
Fig. 8A     Fig. 8B
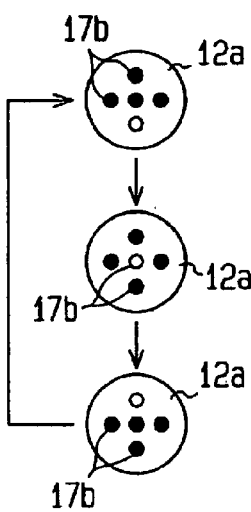     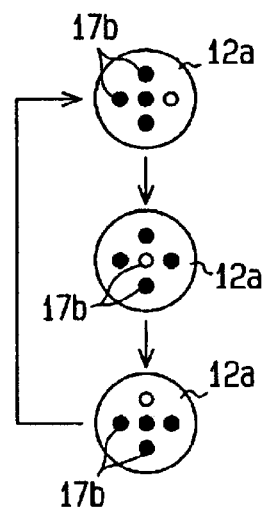

SHIFT DEVICE

BACKGROUND OF THE INVENTION

The present invention is related to a shift device, and more particularly, to a shift device for shifting a connected state of a vehicle transmission through electric control.

A plurality of shift devices that can shift a connected state of a transmission (shift range) have been proposed in the prior art. In the conventional shift devices, a shift position display is arranged on an instrument panel or a shift operation unit. However, the shift position display is only lit to display the shift range of the transmission. Therefore, it is difficult to optimally operate the shift device.

SUMMARY OF THE INVENTION

It is an object of the present invention to provide a shift device that is optimally operated.

In one perspective of the present invention, a shift device provided in a vehicle has a transmission. The shift device shifts a shift range of the transmission. The shift device includes a shift operation unit, a controller, and a light emitting device. The shift operation unit is connected to the transmission of the vehicle to shift the shift range of the transmission. The controller determines whether the shift range of the transmission should be shifted in accordance with a driving environment and generates a shift instruction signal when determining that the shift range of the transmission should be shifted. The light emitting device is connected to the controller to give a notification for operation of the shift operation unit in accordance with the shift instruction signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a perspective view showing another shift operation unit;

FIGS. 8A and 8B are schematic front views showing lit modes of the shift operation unit of FIG. 7;

DETAILED DESCRIPTION OF THE PREFERRED EMBODIMENTS

Figure 1:
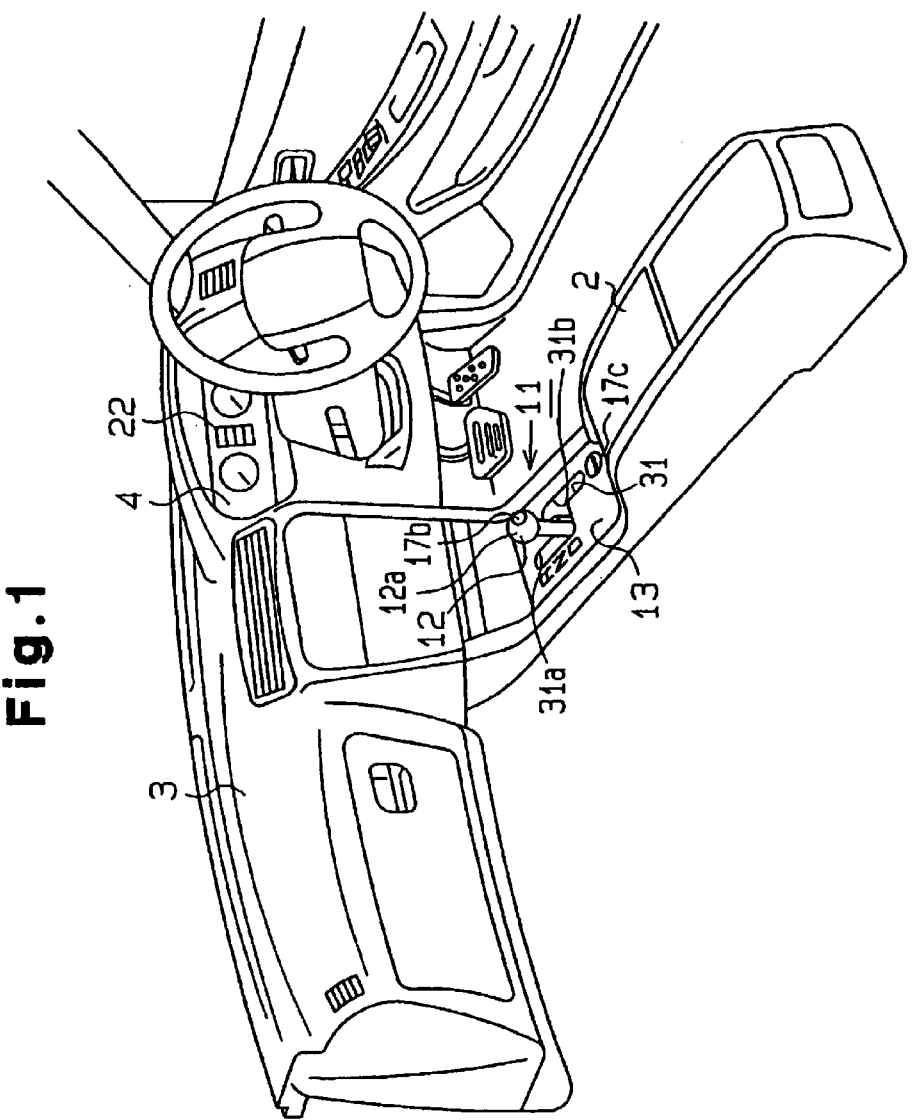
FIG. 1 is an explanatory view showing the interior of a vehicle in which a shift device according to a preferred embodiment of the present invention is arranged.

FIG. 1 is an explanatory view showing the interior of a vehicle in which a shift device according to a preferred embodiment of the present invention is arranged. The shift device of the preferred embodiment is applied to a vehicle transmission controller 20 shown in FIG. 4.

Figure 2:
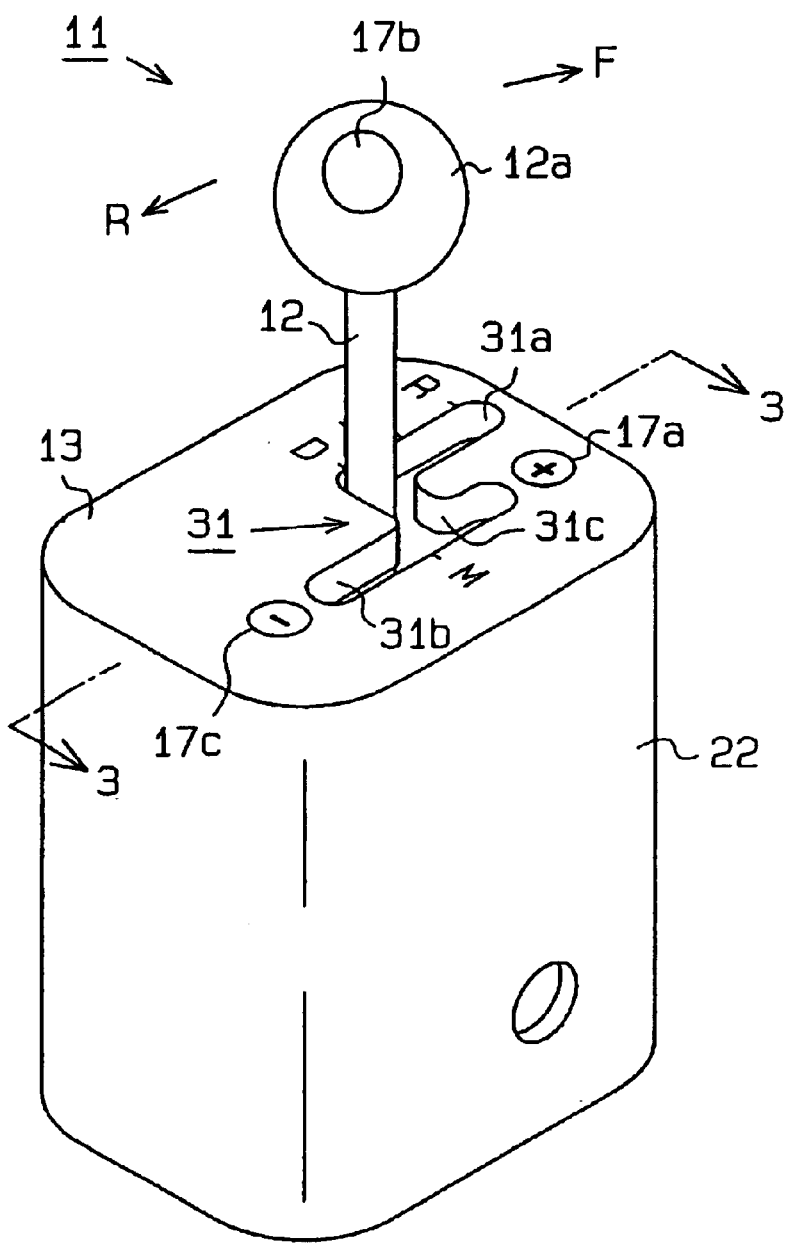
FIG. 2 is a perspective view showing a shift operation unit of the shift device of FIG. 1.

The shift device has a shift operation unit 11, and the shift operation unit 11 is arranged on a center console panel 2 as shown in FIG. 1. FIG. 2 is a perspective view showing the shift operation unit 11. As shown in FIG. 2, the shift operation unit 11 includes a shift lever 12 and a main body 13, which supports the shift lever 12. The main body 13 has a shift gate 31. The shift gate 31 includes a first gate 31a and a second gate 31b, which are connected by a connection gate 31c.

Figure 3:
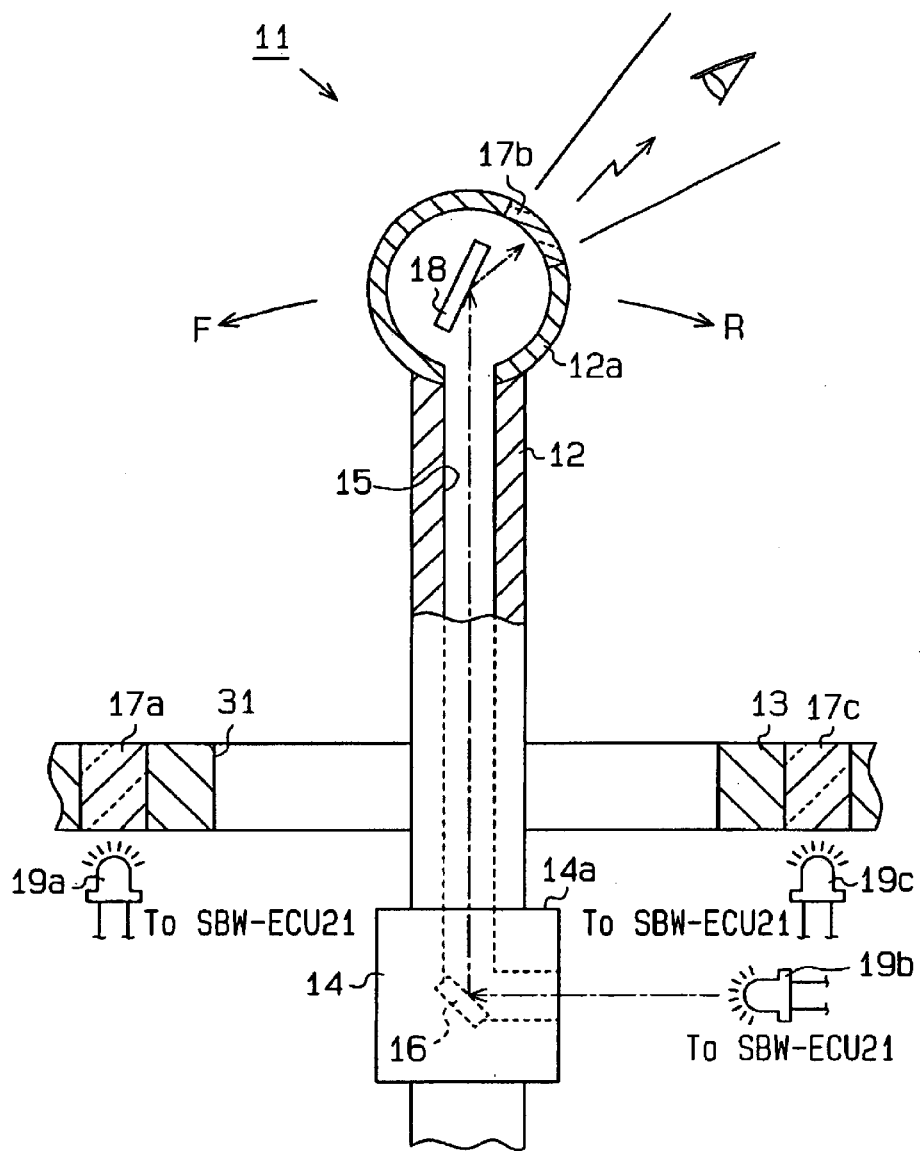
FIG. 3 is a schematic cross-sectional view of the shift operation unit taken along line 3—3 in FIG. 2.

FIG. 3 is a schematic cross-sectional view of the shift operation unit 11 taken along line 3—3 line in FIG. 2. As shown in FIG. 3, the shift lever 12 has a support portion 14 in the main body 13. The support portion 14 is supported by a support mechanism (not shown), which is arranged in the main body 13. The shift lever 12 inclines in the directions indicated by arrows F, R shown in FIG. 3 with the support portion 14 serving as a pivoting center and is operated in correspondence with the shift gate 31. More specifically, as shown in FIG. 2, when the shift lever 12 is shifted in the first gate 31a in the direction of arrow F, the shift range switches in the order of "D" range, "N" range, and "R" range. When the shift lever 12 is shifted in the second gate 31b in the direction of the arrow F, the shift range is switched to an shift-up position (+). When the shift lever 12 is shifted in the second gate 31b in the direction of arrow R, the range is shifted to a shift-down position (−).

As shown in FIG. 3, a hollow portion 15 is formed in the shift lever 12 from the support portion 14 to a shift knob 12a along the axial direction of the shift lever 12. The hollow portion 15 is bent at a right angle in the support portion 14 and the end of the hollow portion 15 is opened in a side surface 14a of the support portion 14. A reflector 16 is arranged at the bent part of the hollow portion 15. The surface of the reflector 16 is mirror-like, and the reflector 16 reflects light, which enters from the opening of the support portion 14, in the axial direction of the shift lever 12.

A reflector 18 is arranged in the shift knob 12a. The reflector 18 further reflects the reflected light from the reflector 16 toward lens 17b (second light radiation portion). As shown in FIG. 3, the lens 17b is arranged on the shift knob 12a so as to face a driver's head.

Lenses (first light radiation portion) 17a, 17c are arranged near the two ends of the first gate 31a of the main body 13. Each of the lenses 17a, 17c displays the accelerating range (+) and the decelerating range (−) when an automatic transmission 25 is in a manual transmission mode. In the preferred embodiment, the shift lever 12 is a momentary type in the manual transmission mode.

As shown in FIG. 3, a light emitting element 19b is arranged in the main body 13. The light emitting element 19b is arranged along a line extended from the opening of the support portion 14. The light of the light emitting element 19b always enters the hollow portion 15 from the opening of the support portion 14 regardless of the operation of the shift lever 12. The entered light is refracted by each reflector 16, 18 and radiated from the lens 17b. Therefore, the lens 17b is lit when the light emitting element 19b is lit. The light emitting element 19b is electrically connected to an SBW-ECU 21 (refer to FIG. 4) and is lit in accordance with an operation signal from the SBW-ECU 21.

The light emitting element 19b includes a double-color light emitting diode (LED). In the preferred embodiment, when the shift lever 12 is to be operated to the shift-up position (+), the light emitting element 19b is lit in green. When the shift lever 12 is to be operated to the shift-down position (−), the light emitting element 19b is lit in red. The light emitting element 19b flashes until the operation of the shift lever 12 is finished.

As shown in FIG. 3, further light emitting elements 19a, 19c are arranged in the main body 13. The light emitting elements 19a, 19c are arranged under the lenses 17a, 17c, respectively. Therefore, the lights of the light emitting elements 19a, 19c are radiated from the lens 17a, 17c, respectively. Each light emitting element 19a, 19c emits light in accordance with the operation signal from the SBW-ECU 21.

The light emitting element 19a includes a green LED, and the light emitting element 19c includes a red LED. When the shift lever 12 is to be operated to the shift-up position (+), the light emitting element 19a is lit in green. When the shift lever 12 is to be operated to the shift-down position (−), the light emitting element 19c is lit in red. Each of the light emitting elements 19a, 19c flashes until the operation of the shift lever 12 is finished. The light emitting element 19a, 19c emits the same color as the light emitting element 19b at the same timing.

Figure 4:
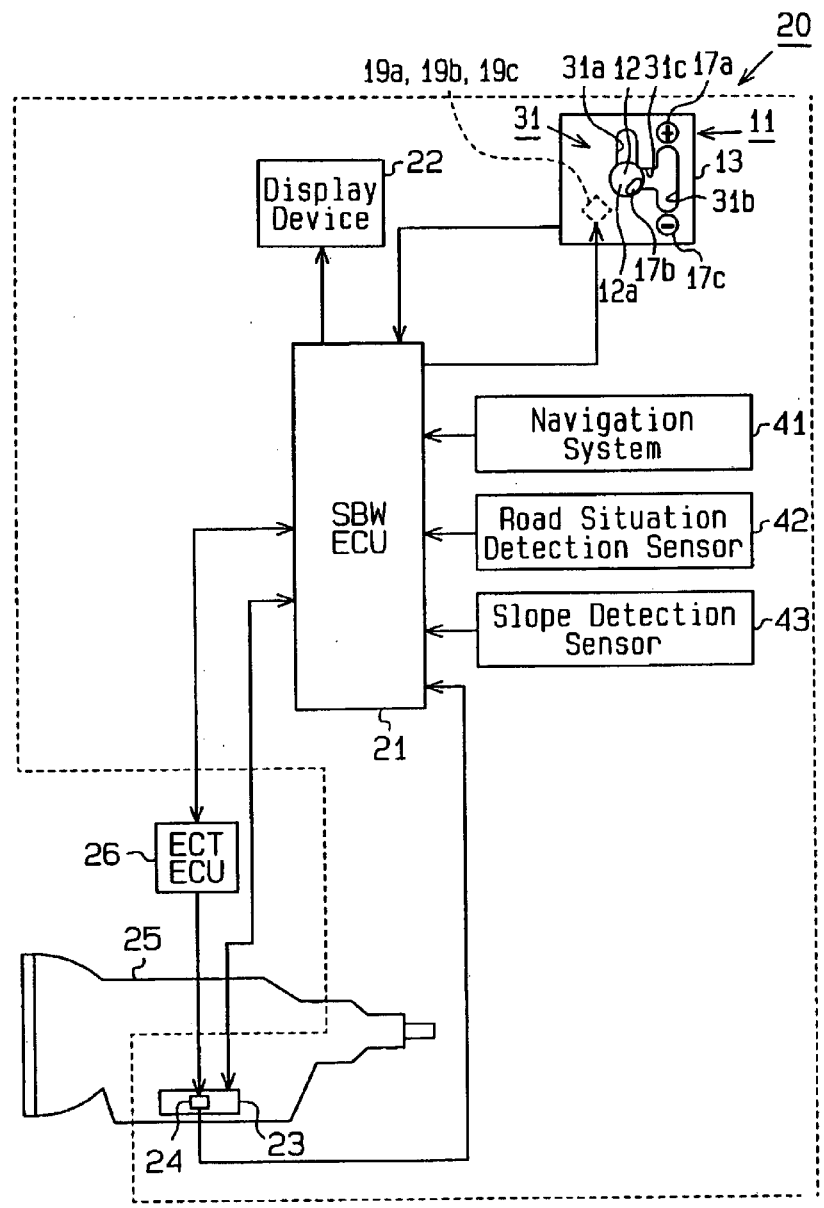
FIG. 4 is a schematic block diagram of a vehicle transmission controller.

FIG. 4 is a schematic electric block diagram of the vehicle transmission controller (shift device) 20. As shown in FIG. 4, the vehicle transmission controller 20 includes the shift operation unit 11 and the electronic controller (SBW-ECU) 21, which is used to control gear shifting. The shift operation unit 11 has a plurality of (three in the preferred embodiment) notifying devices (light emitting devices). The three light emitting devices include light emitting diodes (light emitting elements) 19a, 19b, 19c and the lenses (light radiation portions) 17a, 17b, 17c, which are arranged in correspondence with the light emitting elements.

A display device 22, a transmission hydraulic actuator 23, and a range position detection device 24 are connected to the SBW-ECU 21.

The display device 22 is an indicator, which displays the shift range, and is arranged on a combination meter 4 of the instrument panel 3, as shown in FIG. 1. The display device 22 displays the presently selected shift range in accordance with the control signal of the SBW-ECU 21.

The transmission hydraulic actuator 23 is provided in the automatic transmission 25 and has an electromagnetic control valve (not shown), which is operated by an electric signal. The electromagnetic control valve of the transmission hydraulic actuator 23 controls the operational oil supplied from a hydraulic pump, to shift the connection state of a gear train (shift range). The connection state of the gear train includes a reverse state "R", a neutral state "N", and a drive state "D".

The range position detection device 24 is arranged in the automatic transmission 25, detects the connection state ("R", "N", "D") of the gear train, and generates a connection detection signal. The connection detection signal is provided to the SBW-ECU 21.

The SBW-ECU 21 has a microcomputer (not shown) and a memory (not shown). The microcomputer controls the transmission hydraulic actuator 23 to shift the connection state of the gear train in accordance with the control program previously stored in the memory. The SBW-ECU 21 controls the transmission hydraulic actuator 23 in accordance with the operation signal from the shift operation unit 11 and the connection detection signal from the range position detection device 24.

A transmission electronic control unit (ECT-ECU) 26, which is connected to the SBW-ECU 21, shifts the connection state of the gear train in accordance with the vehicle velocity and the throttle angle through a known control.

The SBW-ECU 21 is connected to a navigation system 41, a road situation detection sensor 42, and a slope detection sensor 43. In the automatic transmission mode of the transmission 25, the navigation system 41 detects the shape of the road in the moving direction of the vehicle and generates a navigation signal. The navigation signal is provided to the SBW-ECU 21.

The road situation detection sensor 42 detects the road situation (such as, rain, snow, ice) and generates a slip detection signal. The slip detection signal is provided to the SBW-ECU 21. The slope detection sensor 43 detects the slope of the road and generates a slope detection signal. The slope detection signal is provided to the SBW-ECU 21. The range position detection device 24 detects the gear of the transmission 25 in the automatic transmission mode and generates a gear position detection signal. The gear position detection signal is provided to the SBW-ECU 21.

The SBW-ECU 21 determines the timing for switching the shift range of the transmission 25 in accordance with the driving environment of the vehicle. More specifically, the SBW-ECU 21 determines the optimal operation timing of the shift lever 12 in accordance with the navigation signal, the slip detection signal, the slope detection signal, and the gear position detection signal. The SBW-ECU 21 determines whether the shift lever 12 should be moved to the shift-up position (+) or the shift-down position (−) from the detection signals.

The SBW-ECU 21 generates the operation signal (shift indication signal) for activating the light emitting elements 19a, 19b, 19c a predetermined time before the timing the shift lever 12 is actually operated, and the SBW-ECU 21 provides the operation signal to the light emitting elements 19a, 19b, 19c. The predetermined time is set so that is almost the same as the sum of the time required for the driver to recognize the activated light emitting elements 19a, 19b, 19c and the operation time required for the driver to finishing a gear shifting operation with the shift lever 12. The SBW-ECU 21 activates the light emitting elements 19a, 19b, 19c to notify the driver of the operation of the shift lever 12.

For example, to notify the driver that the shift lever 12 should be moved to the shift-up position (+), the SBW-ECU 21 provides the operation signal to the light emitting element 19a, which corresponds to the shift-up position (+). The operation signal activates and causes the light emitting element 19a to flash. The SBW-ECU 21 also provides the operation signal to the light emitting element 19b. The light emitting element 19b is lit in green and flashes in accordance with the operation signal. In this state, the green light is radiated from the lens 17b and the lens 17a. Therefore, the driver is notified that the shift lever 12 should be moved to the shift-up position (+). When the range position detection device 24 detects that the operation of the shift lever 12 has shifted up the gear range, the SBW-ECU 21 stops providing the operation signal to the light emitting elements 19a, 19b.

To notify the driver that the shift lever 12 should be moved to the shift-down position (−), the SBW-ECU 21 provides the operation signal to the light emitting element 19c, which corresponds to the shift-down position (−). The operation signal activates and causes the light emitting element 19c to flash. The SBW-ECU 21 also provides the operation signal to the light emitting element 19b. The light emitting element 19b is lit in red and flashes in accordance with the operation signal. In this state, the red light is radiated from the lens 17b and the lens 17c. Therefore, the driver is notified that the shift lever 12 should be moved to the shift-down position (−). When the range position detection device 24 detects that the operation of the shift lever 12 has shifted down the gear range, the SBW-ECU 21 stops providing the operation signal to the light emitting elements 19b, 19c.

The shift device according to the preferred embodiment has the following advantages.

(1) The SBW-ECU 21 determines the optimal operation timing of the shift lever 12 in accordance with each detection signal and determines whether the shift lever 12 should be moved to the shift-up position (+) or the shift-down position (−). The SEW-ECU 21 activates the light emitting elements 19a, 19bm 19c in accordance with the determination and notifies the driver how to operate the shift lever 12. Therefore, the driver recognizes the direction the shift lever 12 should be operated in a simple and desirable manner.

(2) The lenses 17a, 17b, 17c are arranged on the shift operation unit 11. Thus, the shift operation unit 11, which is the operated subject, is lit. The shift operation unit 11 is arranged on the center console panel 2, which has fewer lit portions than the combination meter 4. Thus, the driver confirms the lit lenses 17a, 17b, 17c and easily recognizes the position of the shift operation unit 11.

(3) The lens 17a, 17c are arranged near the two ends (the portions corresponding to the shift-up position (+) and the shift-down position (−)) of the second gate 31b of the main body 13. This further facilitates recognition of the direction in which the shift lever 12 should be operated.

(4) The lenses 17a, 17c are arranged on the main body 13, and the lens 17b is arranged on the shift lever 12. Therefore, in addition to the main body 13, the shift lever 12 itself is also lit. Therefore, the driver easily recognizes the position of the shift lever 12 and ensures the gripping of the shift lever 12 when operating the shift lever 12.

(5) When the SBW-ECU 21 gives a notification for a shift operation to the shift-up position (+), the lenses 17a, 17b (the light emitting elements 19a, 19b) are lit in green. When the SBW-ECU 21 gives a notification for a shift operation to the shift-down position (−), the lens 17c (the light emitting elements 19b, 19c) is lit in red. Therefore, the lights having different colors prevent unintentional operation of the shift lever 12.

It should be apparent to those skilled in the art that the present invention may be embodied in many other specific forms without departing from the spirit or scope of the invention.

The light emitting elements 19a, 19c may be lit in the same color. The informing of the shift-up position (+) and the notification of the shift-down position (−) may be distinguished by changing the flashing speed or the flashing pattern of the light emitting elements 19a, 19c.

The light emitting elements 19a, 19b, 19c may be lit at the same timing as when the shift lever 12 is operated.

The light emitting element 19b may be a monochromatic light element.

The light emitting elements 19a, 19b, 19c may be EL elements or bulbs.

The light emitting elements 19a, 19b, 19c do not have to be arranged in the shift operation unit 11. It is only required that the light emitting elements 19a, 19b, 19c be arranged so that the lights of the light emitting elements 19a, 19b, 19c are radiated from the lenses 17a, 17b, 17c.

The lens 17b and the light emitting element 19b may be omitted.

Further lenses may be provided in portions of the first gate 31a corresponding to the R, N, and D ranges to notify the driver of the optimal timing for shifting the shift lever 12 to each of the R, N, and D ranges and of the operation direction.

Figure 5:
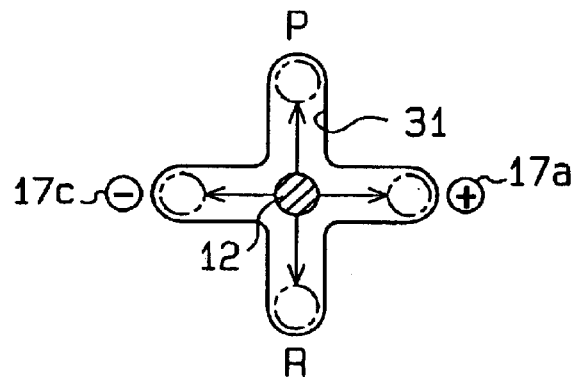
FIG. 5 is a front view showing a shift gate of another shift operation unit.

As shown in FIG. 5, the shift gate 31 may have a cross-like shape.

Figure 6:
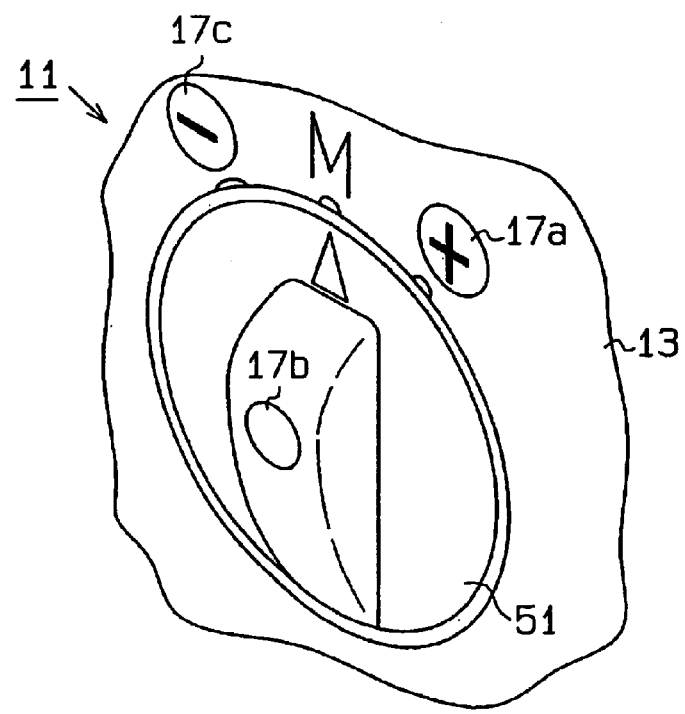
FIG. 6 is a perspective view showing another shift operation unit.

As shown in FIG. 6, the operation device may be a dial 51.

As shown in FIG. 7, the lenses 17b may be arranged in the shift knob 12a at a plurality of locations. In addition to the operation timing, the driver may be notified of the operation direction and the operation urgency. More specifically, to have the driver move the shift lever 12 forward, the lenses 17b are lit in the order of rear, middle, and front (the lens indicated by a white circle in FIG. 8A). To have the driver move the shift lever 12 through the connection gate 31c, the lenses 17b are lit in the order of right, middle, front, as shown in FIG. 8B. The urgency of operation is indicated by the moving speed of the lit lenses 17b.

Figure 9:
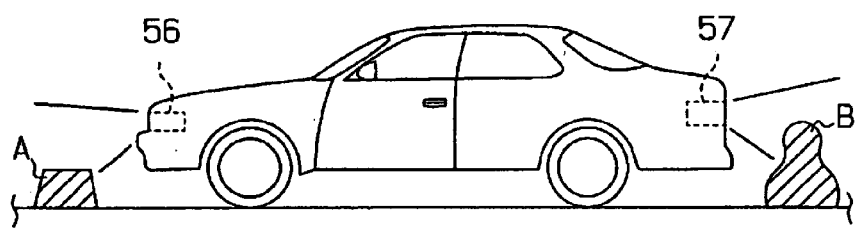
FIG. 9 is a schematic view illustrating another shift device.
Figures 10A, 10B:
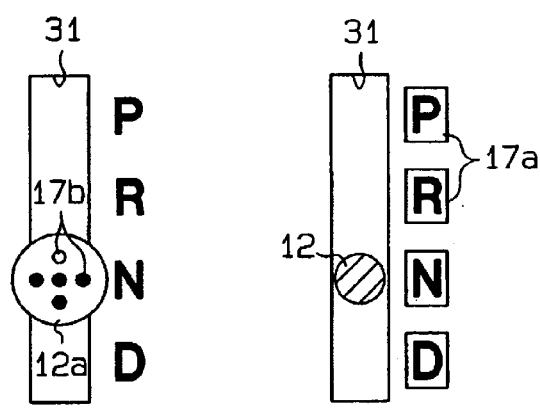
FIGS. 10A and 10B are schematic front views showing lit modes of another shift operation unit.

As shown in FIG. 9, cameras 56, 57 may be provided in the front and rear portions of the vehicle, and when the cameras 56, 57 detect obstacles A, B, the direction in which the driver should perform an operation is notified. More specifically, as shown in FIG. 10A, when the camera 56 detects an obstacle A, the front lens 17b (the lens indicated by a white circle in FIG. 10A) may be lit. Alternatively, as shown in FIG. 10B, when the camera 56 detects obstacle A, a lens 17a corresponding to the R range may be lit. A radar or a sensor may be used in lieu of the cameras 56, 57.

The shift operation unit 11 may be arranged on the instrument panel 3 or a steering column. It is preferred that the lenses 17a, 17b, 17c be arranged at positions that can easily be seen by the driver regardless of where the shift operation unit 11 is arranged.

The shift operation unit may be a stationary type shift operation unit of or a cable type shift operation unit.

The notifying device is not limited to the light emitting device. It is only required that the notifying device give a notification of the operation of the shift operation unit 11 in accordance with the operation signal (the shift indication signal) from the SBW-ECU 21.

What is claimed is:

1. A shift device provided in a vehicle having a transmission, wherein the shift device shifts a shift range of the transmission, the shift device comprising:

a shift operation unit connected to the transmission of the vehicle to shift the shift range of the transmission;

a controller for determining whether the shift range of the transmission should be shifted in accordance with a driving environment and for generating a shift instruction signal when determining that the shift range of the transmission should be shifted; and a plurality of light emitting devices connected to the controller for giving a notification for operation of the shift operation unit in accordance with the shift instruction signal and being arranged in the shift operation unit.

2. The shift device according to claim 1, wherein:

the shift operation unit includes an operation device, which is operated to shill the shift range of the transmission, and a main body, which supports the operation device; and the plurality of light emitting devices each include a light emitting element and a light radiation portion, which corresponds with the light emitting element.

3. The shift device according to claim 2, wherein the light radiation portion includes:

a first light radiation portion arranged in the main body; and a second light radiation portion provided in the operation device.

4. The shift device according to claim 3, wherein:

the operation device includes a shift knob;

the shift range of the transmission includes a manual transmission range;

the first light radiation portion, in the manual transmission range, provides a first notification for the driver to shift a gear of the vehicle upward and a second notification for the driver to shift the gear of the vehicle downward; and the second light radiation portion is arranged on the shift knob and, in the manual transmission range, provides a notification for the driver to shift the gear of the vehicle upward simultaneously with said first notification of the first light radiation portion and a notification for the driver to shift the gear of the vehicle downward simultaneously with said second notification of the first light radiation portion.

5. The shift device according to claim 1, wherein:

the shift range is one of a plurality of shift ranges; and the plurality of light emitting devices are respectively arranged in correspondence with the plurality of shift ranges.

6. The shift device according to claim 1, wherein:

the shift range of the transmission includes a manual transmission range; and the light omitting device gives a notification for operation to shift-up a gear of the vehicle and a notification for operation to shift-down the gear of the vehicle in the manual transmission range.

7. The shift device according to claim 6, wherein the light emitting device gives the notifications for the operation to shift-up the gear of the vehicle and for the operation to shift-down the gear of the vehicle by using different display colors.

8. The shift device according to claim 1, wherein the controller generates the shift instruction signal a predetermined time before the shift operation unit is actually operated and provides the shift instruction signal to the light emitting device.

9. The shift device according to claim 1, wherein the light emitting device includes a light emitting element and a light radiation portion arranged in correspondence with the light emitting element.

10. The shift device according to claim 9, wherein the light emitting element is a light emitting diode, and the light radiation portion is a lens.

11. The shift device according to claim 1, wherein:

the vehicle has an instrument panel; and the light emitting device is arranged on the instrument panel.

12. A shift device provided in a vehicle having a transmission, wherein the shift device shifts a shift range of the transmission, the shift device comprising:

a shift operation unit connected to the transmission of the vehicle to shift the shift range of the transmission;

a controller for determining whether the shift range of the transmission should be shifted in accordance with a driving environment and for generating a shift instruction signal when determining that the shift range of the transmission should be shifted; and a plurality of notifying devices connected to the controller for giving a notification for operation of the shift operation unit in accordance with the shift instruction signal and being arranged in the shift operation unit.

* * * * *

UNITED STATES PATENT AND TRADEMARK OFFICE
CERTIFICATE OF CORRECTION

PATENT NO. : 6,707,379 B2  Page 1 of 1
APPLICATION NO. : 10/090452
DATED : March 16, 2004
INVENTOR(S) : Chikao Nagasaka It is certified that error appears in the above-identified patent and that said Letters Patent is hereby corrected as shown below:

Under (73) Assignee:
please delete "Riki" and insert --Rika--

Signed and Sealed this

Twentieth Day of January, 2009

JON W. DUDAS
*Director of the United States Patent and Trademark Office*